A. TIXIER.
SAND FILTER AND THE LIKE.
APPLICATION FILED OCT. 19, 1909.
989,665.
Patented Apr. 18, 1911.
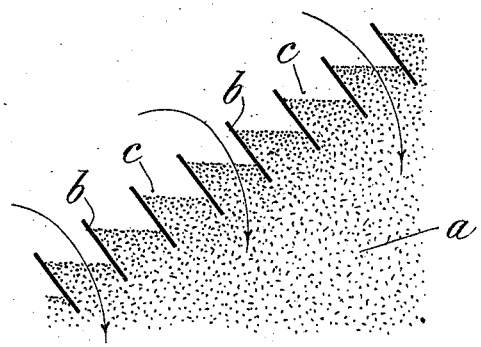
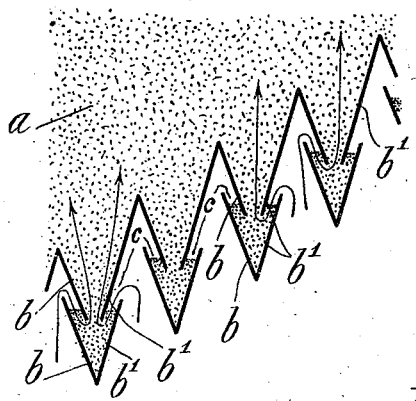
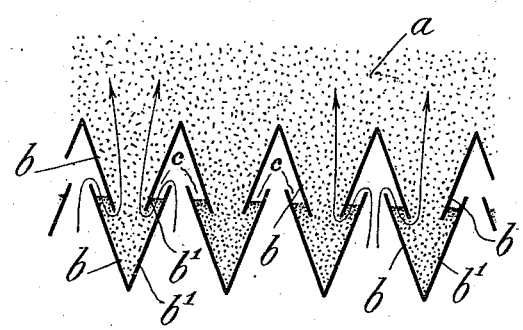
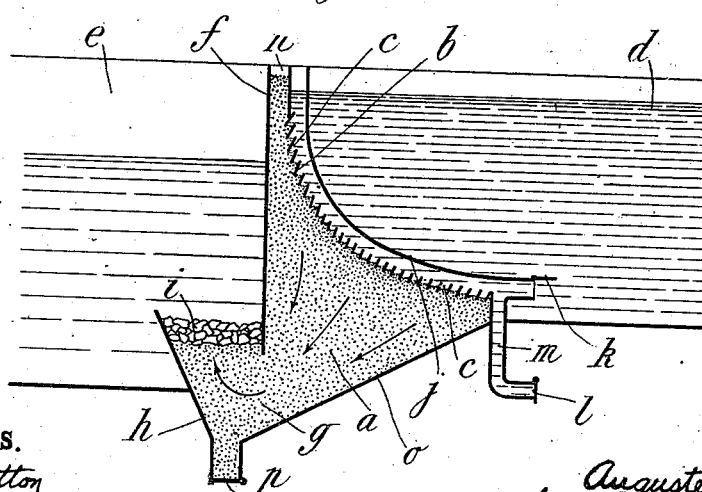
Witnesses.
Jesse N. Lutton
May Ellis.
Inventor.
Auguste Tixier
by Henry Orth
Atty.

UNITED STATES PATENT OFFICE.

AUGUSTE TIXIER, OF BILLANCOURT, FRANCE.

SAND FILTER AND THE LIKE.

989,665. Specification of Letters Patent. Patented Apr. 18, 1911.

Application filed October 19, 1909. Serial No. 523,417.

*To all whom it may concern:*

Be it known that I, AUGUSTE TIXIER, citizen of the Republic of France, residing at 5 Sente de la Pyramide, Billancourt, Seine, in the said Republic, chemist, have invented certain new and useful Improvements in Sand Filters and the Like; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

A largely used means of purifying water and other liquids or freeing gases from dust, consists in filtering the same through a bed of fine sand or some similar material. Now, so long as the filtering bed is new the fluid passes through it easily and in proportion to its head or pressure but after a short time the solid materials suspended in the fluid form a deposit on the filtering bed and the discharge of the filter materially decreases. It is therefore necessary to clean the surface of the bed from time to time; this is rather expensive, especially in the case of large filtering plants and it causes a stop and requires the filtering material being taken off and replaced.

The object of this invention is to remedy the above defects and permit the cleaning of a filter of this kind very quickly and as frequently as may be desirable.

The invention consists in utilizing the fact that fine sand or similar material has the character of an imperfect liquid, that is to say flows very easily, as a liquid would do, through an opening above which it is in charge but does not act on the principle of communicating vessels; in effect, when fine sand is poured in a two-branched tube, it does not rise as high in the second branch as in the first one, a small quantity of sand passed along in the former being sufficient to balance the head in the latter. In the invention, this property is taken advantage of by inclosing a mass of fine sand or similar filtering material in a casing made of blades overlapping each other and separated from each other, like the blades of a Venetian blind, so that the interval between two adjacent blades acts like the second branch of a two-branched tube; the filter space acts as the first branch thereof. The liquid or gas to be filtered enters the filter through the intervals of the blades and is discharged through a proper opening after passing through the filtering mass. It may pass through the latter either downward or upward or in any direction, so that the filter may be devised in different ways according to the purpose without departing from the principle of this invention. Whenever the liquid or gas to be filtered is under the inlet wall of the filter instead of being above it, it is necessary to use two rows of blades, instead of one, and arrange the blades in pairs forming V-shaped troughs in each row. In either case the fluid to be filtered deposits the most part of the impurities on the sand contained in the intervals of the blades, that is to say in the small chambers which act like the second branch of a two-branched tube, so that it is only necessary to remove from time to time the upper layer of that sand in order to enable the filter to work perfectly again; this cleaning may be effected either by scraping the surface or by means of a current of water. The small quantity of sand thus removed is automatically replaced by the mass contained in the body of the filter bed, which is in its turn re-filled through a filling opening; another aperture permits discharge of all the sand when necessary.

The blades forming the wall through which the liquid or gas to be filtered enters the filter may be either straight or curved and for instance circular if it is desired to make a round filter but the assemblage is preferably inclined, generally, to facilitate cleaning. In vertical section said wall must be inclined or curved if the fluid is above it, while if it is under it said wall (then made up of two rows of V-shaped troughs) may similarly be inclined or curved or else be horizontal.

On the drawings Figure 1 is a vertical section of a portion of the inlet wall of a filter made according to the invention and in which the fluid enters from above. Figs. 2 and 3 are vertical sections showing a portion of the inlet wall of a filter in which the fluid enters from below. Fig. 4 is a full view in vertical section of a filter made in accordance with this invention. In the figures arrows indicate the direction of the fluid through the filtering material.

The same letters of reference designate the same parts in all the figures.

As shown in Fig. 1, whenever the fluid enters the filter from above the blades $b$, $b$, the intervals of which act like the second branch of a U-shaped tube, are parallel to each other and arranged in a single row. When the fluid enters from below, pairs of blades $b$, $b$ inclined in one direction and pairs of blades $b^1$, $b^1$ inclined in the reverse direction are arranged alternately, and the whole forms two rows of V-shaped troughs which enter each other, leaving clear intervals $c\ c$ between the external faces of the walls $b$, $b^1$ of the upper troughs and the internal faces of the walls $b$, $b^1$ of the lower troughs.

In Fig. 4 which shows a complete filter made according to the invention and suitable for all downward filtrations, $d$ is the receiving tank for the water to be filtered, $e$ is the tank for the filtered water, in which the level is lower than in $d$; these two tanks are separated by a wall $f$ leaving a passage $g$ at the bottom; a wall $h$ rising from the bottom forms with said wall $f$ the small branch of a U-shaped tube, in which the fine sand $a$ of the filter slightly rises this sand is also kept from being carried away by the water by means of a bed of pebbles $i$. The surface of the sand bed is limited on the unfiltered water side by a perforated wall or grating $b$ formed by blades arranged as in Fig. 1.

The water to be treated is supplied to the filtering surface by an inlet chamber of small dimensions formed by a wall $j$ parallel to the latticed grating $b$; the water is supplied to the bottom part of this chamber through a valve $k$. A discharge branch pipe $m$ is provided with a valve $l$ so that when the valve $k$ is shut the inlet chamber can be emptied; water will then flow from the tank $e$ and drive off the mud or sediment accumulated in the intervals of the blades $b$ of the grating, which will be discharged through the valve $l$ together with a small quantity of sand; the latter may be collected and washed and be used again. The small quantities of sand thus taken off are replaced through fresh sand introduced in the filter by a filling opening $n$.

The body of the filtering material rests upon a base formed by two planes $h$ and $o$ inclined toward a discharge valve $p$ which can be opened when necessary in order to allow the water to draw away the whole of the sand.

Having thus described my invention I claim as new and desire to secure by Letters Patent:

1. In a filter for liquids and gases, a body of granular filtering material, a wall formed by spaced blades to hold the filtering material, a supply chamber of which said wall forms a part, means to produce a scouring current of liquid over said wall to remove the surface of the filtering material exposed between the blades.

2. In a filter for liquids and gases, a body of granular filtering material, a wall having a general inclined direction formed by spaced blades to hold the filtering material, a supply chamber of which said wall forms a part, means to produce a scouring current of liquid over said wall to remove the surface of the filtering material exposed between the blades.

3. In a filter for liquids and gases, a body of filtering material in grains; a receptacle containing this material; an inlet wall on said receptacle formed of blades the intervals of which serve as inlet openings for the fluid to be filtered, and between which the filtering material automatically rises like in one branch of a U-shaped tube; two other walls on the same receptacle, in the interval of which the filtering material rises in one branch of a U-shaped tube, which interval serves as a discharge opening for the filtered fluid; a receptacle for the filtered fluid; a receptacle for the fluid to be filtered; a cleaning canal along the inlet wall of the filter communicating at its lower end with the receptacle of the fluid to be filtered; a valve on said canal to cut off the above said communication; a branch pipe on said canal, through which the fluid used for cleaning the filter and the materials carried along with it are discharged; a valve on that branch pipe; an upper filling opening in the receptacle containing the filtering material; and a lower opening in same receptacle for taking off the whole body of filtering material when desired.

4. In a filter for liquids and gases, a body of granular filtering material, an inclined wall formed by spaced blades to hold the filtering material, a supply chamber having at its lower end a valved inlet and a valved discharge whereby a current of scouring liquid passing through said chamber and discharge will remove the surface particles of the material exposed between said blades.

5. In a filter for liquids and gases, two walls one of which is inclined and composed of spaced inclined plates, a granular filtering medium between the walls, a supply chamber to supply fluid to be filtered to and between the plates having at its bottom a valved inlet and a valved discharge, and a discharge for the filtering medium between the walls.

6. In a filter for liquids and gases a substantially vertical wall, a second inclined wall composed of spaced inclined plates, and a third wall forming an inlet chamber between it and the wall of spaced plates, said walls spaced from one another at their upper ends, a hopper shaped bottom below and distant from the substantially vertical wall, a granular filtering material held between the first two walls and bottom, a discharge for filtering material in said bottom, a valved inlet and a valved discharge at the bottom of the inlet chamber.

In testimony that I claim the foregoing as my invention, I have signed my name in presence of two subscribing witnesses.

AUGUSTE TIXIER.

Witnesses:
   DEAN B. MASON,
   HENRY THIESTE.

Copies of this patent may be obtained for five cents each, by addressing the "Commissioner of Patents, Washington, D. C."